Feb. 18, 1941.                    W. G. HUDSON                    2,232,606
                                  MASS CONVEYER
                              Filed April 4, 1940                 2 Sheets-Sheet 1
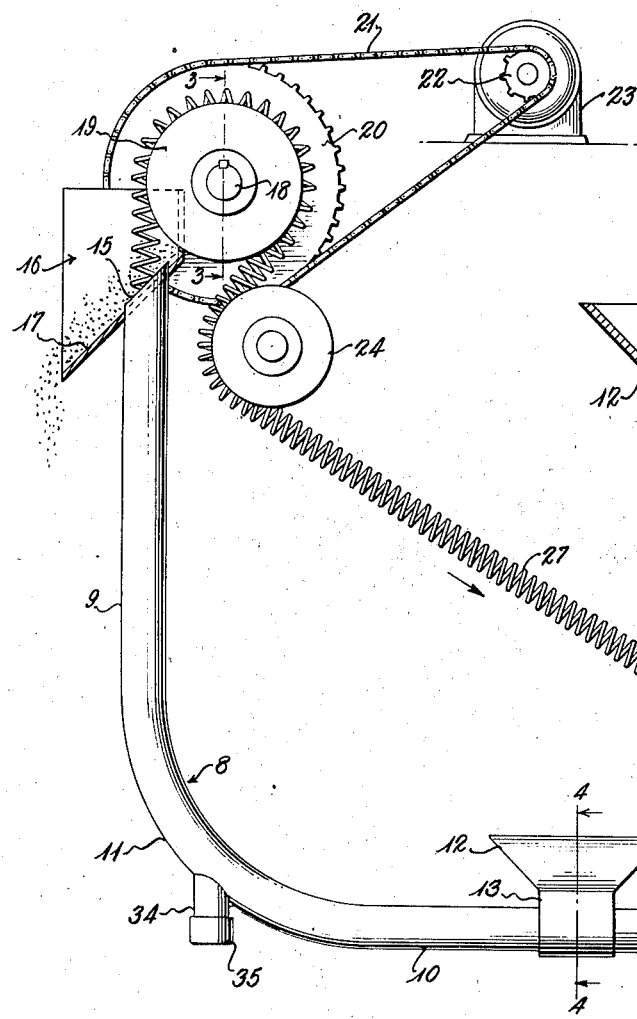
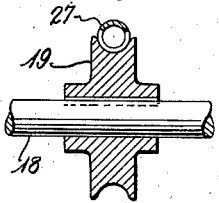
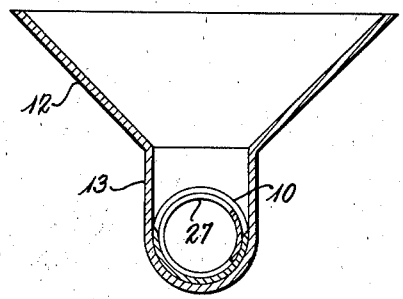
Inventor
Wilbur G. Hudson Feb. 18, 1941.   W. G. HUDSON   2,232,606
MASS CONVEYER
Filed April 4, 1940   2 Sheets-Sheet 2
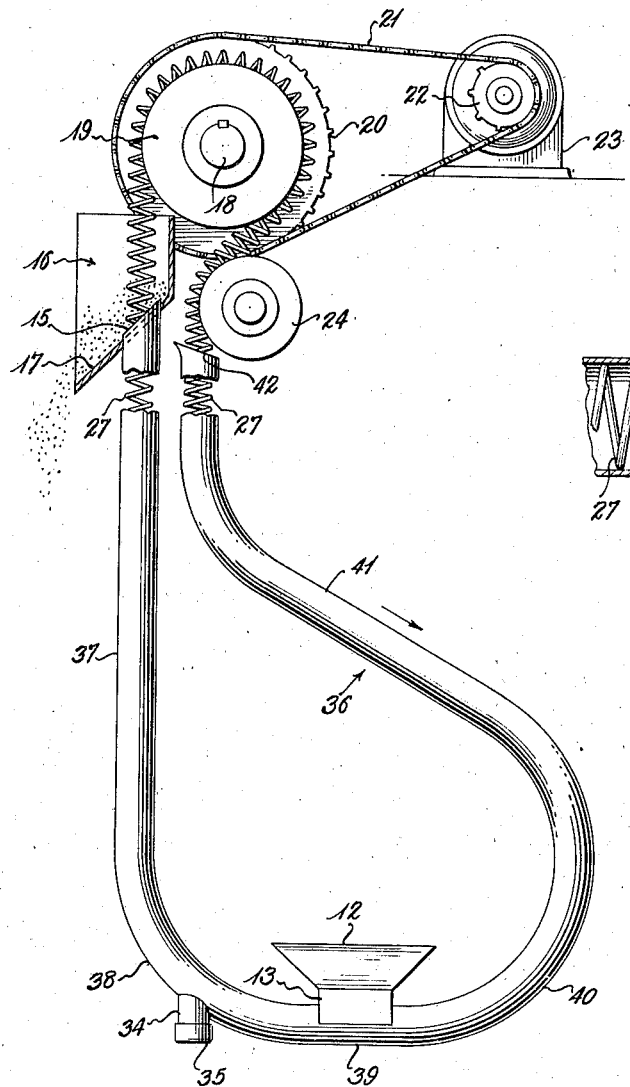
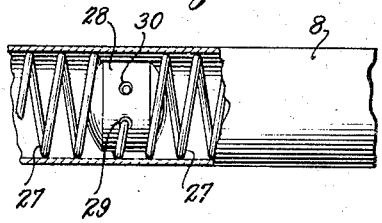
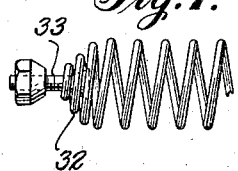
Inventor
Wilbur G. Hudson Patented Feb. 18, 1941

2,232,606

UNITED STATES PATENT OFFICE 2,232,606

MASS CONVEYER

Wilbur G. Hudson, Chicago, Ill.

Application April 4, 1940, Serial No. 327,877

9 Claims. (Cl. 198—168)

This invention relates to new and useful improvements in conveyers for moving flowable solid materials en masse, and deals more particularly with a form of conveyer element which is capable of moving pulverized or granular materials as a continuous mass between loading and discharging points of a conduit, duct, casing, or the like, which may be arranged to extend in any desired direction or directions relative to the horizontal and/or the vertical.

Heretofore, it has been the practice to convey flowable solid materials through conduits, ducts, casings, or the like, by means of spaced flight members which are interconnected and driven by chains, cables, or other articulated or flexible elements. These flight members have always been either of solid or skeleton formation and either substantially entirely or only partially filled the cross-sectional area of the conduits, etc. Certain types of these flight members function to positively drag, push, or scrape the materials along in moving them through the conduits. The remaining types cooperate with their interconnecting and driving elements to provide a "reinforcement" for the mass and depend on friction and the tendency of the material particles to coalesce to effect en masse movement.

The present invention embodies an entirely different conveying principle in that the flowable materials are transported primarily as a core which, theoretically, is formed of an infinite number of hemispherical arches or domes that are propelled and in part supported by an endless, flexible conveyer element of tubular form which is both extensible and contractible. To enable this tubular conveyer element to be loaded and discharged at any desired point throughout the selected path of travel, it preferably takes the form of an open pitched spiral or helix. This interrupted tube, therefore, is dependent on its enclosing conduit for keeping the transported core confined while traveling between loading and discharging points. It will be apparent from the above discussion that the conveyer element is not susceptible of being divided into or identified as separate flight members and an articulating or flexing driving and interconnecting element.

This endless, extensible, tubular spiral or helix, traveling within a conduit or duct, forms a carrying element which transports material without the necessity of employing solid or skeleton flights, pushers, buckets, or the like. As stated, the mass is elevated as an infinite number of hemispherical arches or domes which are propelled and supported, with the aid of the confining conduit walls, by the spiral convolutions. As the spirals emerge from the conduit, upon reaching a point of discharge, the arches or domes collapse and the material flows outwardly through the uncovered interspaces. Thus, there is an increased efficiency and a decrease in frictional loss as compared with any type of conveyer which scrapes, drags, or pushes the material.

At the point of feed, the moving spiral conveyer element is under minimum stress with minimum pitch of the coils or convolutions, and the material feeds through the interspaces and either entirely fills or partially fills the bore of the element. The extent to which the bore is filled depends on the rate of feed of the material and the relative rate or speed of travel of the conveyer element. The stress then progressively increases toward the driving point of the conveyer path. This progressive increase in stress produces a corresponding increase in pitch of the convolutions and relieves any tendency of the core of material to pack or jam.

It is unnecessary to provide any feeder mechanism for this type of conveyer which will determine the rate of speed of the material, since the extensible and contractible conveyer element is loaded at a point of minimum pitch and for that reason cannot be overloaded. It automatically feeds to itself the proper amount of material, depending upon the capacity of the conveyer.

As the conveyer element is extensible, excessive overload caused by jamming or the like, increases its loaded length momentarily, thus increasing the distance throughout which, or within which, a given volume of the material is distributed and thereby relieves the congestion. The friction form of drive wheel used permits of this extension up to the limit of traction as determined by the snub wheel or wrap of the helix around the head wheel and the normal tension on the slack side.

The primary object of this invention is to provide an improved conveyer construction which is efficient and economical in operation, due to its comparative reduction in wear and power requirements and its improved flexibility of path or layout; and which is readily and inexpensively manufactured because of its light construction, small number of parts, and simple method of assembly or fabrication.

Another important object of the invention is to provide a conveyer construction which is capable of transporting materials in any direction, either vertical, horizontal, or on an incline, and in more than one plane if desired, all by virtue of the inherent qualities of the novel transporting element.

A still further object of the invention is to provide a moving conveyer element which is extremely flexible, which is extensible under load and will gradually increase in pitch or length as it passes from a loading point to a discharge point, thereby reducing any tendency of the granular or pulverized materials being transported to jam.

Still another object of the invention is to provide a movable conveying element which is capable of operating at higher speeds than prior art elements which embody a link chain which requires a sprocket or toothed driving element.

Other objects and advantages of the invention will be apparent during the course of the following description.

In the accompanying drawings forming a part of this specification and in which like numerals are employed to designate like parts throughout the same, Figure 1 is a side elevational view of one type of conveyer embodying this invention, Figure 2 is a side elevational view of a different type of conveyer embodying this invention, Figure 3 is a detail, vertical sectional view illustrating the frictional driving sheave or pulley which is employed for moving the conveyer element and is taken on line 3—3 of Fig. 1, Figure 4 is a vertical sectional view taken on line 4—4 of Fig. 1 and illustrates the loading or feeding mechanism employed in connection with these conveyers, Figure 5 is a detail view, partly broken away, of one form of coupling or connecting element which may be employed for interconnecting adjacent ends of conveyor element sections or lengths, Figure 6 is a detail elevational view of another form of joint or connection for conveyer element sections or lengths, and Figure 7 illustrates a still further form of conveyer element joining or connecting structure.

In the drawings, wherein for the purpose of illustration are shown the preferred embodiments of this invention, and particularly referring to Fig. 1, there is illustrated what is known as an L-type of conveyer, or elevator-conveyer, which includes a conveyer conduit, duct, or casing 8 which, specifically, includes a vertical leg portion 9, a horizontal portion 10, and an interconnecting, curved portion 11.

Located at a suitable point in the horizontal portion 10 of the conduit 8 is a feeding hopper 12, see also Fig. 4, which is employed for delivering the flowable solid material by gravity into the delivering portion 13 which is of substantially U-shape in vertical section and which merges with the cylindrical section of the conduit portion 10, as is clearly illustrated in Fig. 4.

At the upper or discharge end 15 of the vertical conduit leg 9, there is provided a discharge chamber 16 which is formed in part by an inclined chute or bottom wall 17. This discharge chamber 16 is of considerably greater horizontal area than the area of the conduit bore, and for that reason the side walls of the chamber will have no confining or supporting effect on flowable materials emerging from the discharge end 15 of the conduit. Any materials which are elevated into the discharge chamber 16 will flow or be released laterally into this chamber and will gravitate down the inclined chute or bottom wall 17 to be discharged into any desired handling or conveying device.

Figs. 1 and 3 disclose a driver shaft 18 which has keyed thereto a grooved sheave or pulley 19. Fig. 1 discloses a sprocket 20 which is attached to the shaft 18 for driving this shaft. A sprocket chain 21 is trained over the sprocket 20 and also over the driver sprocket 22 of the motor 23. This motor, therefore, will drive the shaft 18 and the grooved sheave or pulley 19.

Properly positioned with respect to the driving sheave or pulley is a snub pulley or wheel 24 which, of course, is provided with a peripheral groove. This pulley or wheel 24 will operate to increase the traction of the drive pulley 19.

Properly associated with the appropriately flared starting end 25 of the conduit 8 is a foot wheel or pulley 26 having a peripheral groove. This foot wheel functions to guide any endless member trained thereover into the starting end of the conduit.

Threaded through the bore of the conduit 8 and trained over and around the wheels or pulleys 19, 24, and 26 is an endless conveyer element of the character embodying this invention. This conveyer element 27 takes the form of a helix or spiral. It is made of a strand of spring steel of appropriate gauge or diameter. This strand may be of any desired cross-sectional shape, for example, round, square, rectangular, triangular, etc. The spiral or helical conveyer element should be properly tensioned to provide the desired amount of traction on the periphery of the driver pulley or sheave 19 and to provide the desired normal pitch between adjacent turns or convolutions. It will be seen that this normal pitch, or distance between convolutions, will determine the rate at which granular or pulverized materials may be fed to the bore of this tubular conveyer element.

Due to the construction of this element 27, it will be appreciated that the same is capable of extending and contracting to properly take care of its different operating conditions. Fig. 4 discloses the conveyer element 27 as having a diameter which closely approaches the internal diameter of the bore of the conduit 8. This difference in diameter should be sufficient to allow the flexible member, or conveyer element, to pass freely through this conduit bore and so that the convolutions or turns of the element will keep the surface of the conduit scraped clean of the materials being conveyed.

The flexible, extensible, and contractible conveyer element 27 passes through the loading zone, the loading portion 13 of the hopper 12, under minimum stress, and the adjacent convolutions or turns will be spaced their intended normal distance, or at the minimum pitch. With the conveyer element traveling at its permissible, maximum speed, the pulverized or granular material will enter the bore of the element through the interspaces between the turns or convolutions and the bore will be either completely or substantially completely filled. From the loading zone to the discharge zone the stress will progressively increase. This progressive increase in stress, naturally, will provide a corresponding increase in pitch of the turns or convolutions. The material will be moved through the bore of the conduit 8 in the form of a core positioned within the conveyer element 27. Theoretically, this core is formed as an infinite number of hemispherical arches or domes which are supported on the convolutions or turns of the element and are prevented from collapsing by the walls of the conduit. This transported core, or continuous mass of material, will be relieved of any tendency to pack or jam as it travels from the loading zone to the discharge point because of the progressive increase in pitch referred to above.

As the conveyer element emerges from the discharge end 15 of the conduit, the support afforded by the conduit is removed and the material flows laterally, radially of the conveyer element through the interspaces provided between the convolutions or turns. This discharge is quickly accomplished because of the fact that the maximum pitch, or distance between adjacent turns, occurs or exists at the discharge end of the conduit.

The conveyer element returns to normal or minimum pitch as it leaves the drive pulley 19, thus taking up the slack in the element.

Depending upon the length of the path of travel of the element 27, this element will be composed of one or more sections or lengths which will be connected or coupled together at their adjacent ends to provide the endless element. Many different forms of connections may be provided between these ends of the sections or lengths. Figs. 5 to 7, inclusive, disclose three appropriate forms. In Figs. 5 there is disclosed a plug 28 having openings 29 formed therein to receive the bent terminals 30 of the strands from which the conveyer sections are formed. This plug 28 is spirally grooved to receive the end convolutions of the conveyer sections.

Fig. 6 illustrates the possibility of joining two conveyer sections by means of hooks 31 formed in the extremities of the strands coiled to form the conveyer element. Fig. 7 discloses the extremity of a strand as being shaped to provide a cone end 32 with a swivel bolt 33 passing through the central opening thereof.

The connection or coupling provided between adjacent conveyer sections or lengths can be made to play a very important part in the successful operation of this type of conveyer. For example, it will be appreciated that the rate of movement of material by means of this type of conveyer element is dependent upon the rate of feed or loading. If the conveyer element is not loaded at a rate which corresponds with the maximum conveying capacity of the element, slippage will occur in the vertical leg 9 of the conduit. This slippage will increase in proportion to the rate at which the loading is decreased. If the feeding of material is stopped entirely, the flexible conveyer element will merely pull through the material in the vertical leg 9 of the conduit and very little, if any, material will be lifted to the discharge end 15 and emptied into the discharge chamber 16. It will be impossible, therefore, to unload or empty the conduit 8 after feeding has stopped.

To overcome this inability to empty the conduit, the connection or coupling employed between conveyer element sections or lengths should be of proper construction to completely bridge or materially obstruct the bore of the conveyer element. Such an obstruction will operate to completely unload or clean out the conduit 8 as it prevents the material from slipping backwardly through the bore of the element.

The coupling plug 28 of Fig. 5 is of such a construction as to completely obstruct the bore of the conveyer element and for that reason it will be very effective in cleaning out or emptying a conveyer conduit. The coupling structure of Fig. 7 will function in a similar but not quite as effective manner. The hooked or looped type of coupling disclosed in Fig. 6 will be the least effective as a clean out means.

Returning again to Fig. 1, it will be appreciated that the conduit 8, due to some abnormal operating condition, may become so badly jammed as to prevent the conveyer from operating. To take care of such a situation, a drain or cleanout 34 is provided in the curved portion 11 of the conduit. This drain or cleanout tube is normally closed by the cap 35. Removal of this cap provides access to the bore of the conduit and particularly the vertical leg 9 thereof.

Fig. 2 discloses a conveyer which embodies all of the principles of the conveyer disclosed in Fig. 1. This conveyer of Fig. 2, however, is of the loop type as distinguished from the L-type of Fig. 1. It will be sufficient, therefore, to merely described this looped formation of the conduit and to refer to all of the remaining elements by the same reference characters as those applied to the similar elements of the previously referred to figures.

The conduit 36 of this loop type of conveyer includes a vertical leg 37 which discharges into the chamber 16. The lower end or foot of this vertical leg joins with a curved conduit portion 38. Arranged at a tangent to this curved portion is a straight horizontal section 39. A second curved conduit portion 40 extends from the horizontal straight portion 39 and merges into the return leg 41. This loop type of conduit eliminates the need for any foot wheel as the return run of the conveyer elemet 27 is completely enclosed within and guided by the portions 41 and 40 of the conduit. The snub wheel or pulley 24 performs the additional function of properly leading the conveyer element into the flared entering end 42 of the conduit. The straight or tangentially arranged bottom portion 39 of the conduit functions to provide the normal or minimum pitch for the convolutions or turns of the flexible conveyer element 27 so as to assure proper loading of the same. As has been stated above, this conveyer functions in the same manner as the conveyer of Fig. 2 and for that reason needs no further explanation.

It will be appreciated from the above description that the conduits 8 and 36 may be formed of such rigid materials as metal, molded plastics, or the like, which may be fabricated in any desired manner. Also, the extremely flexible character of the conveyer element makes it possible to employ a flexible conduit, such as a fabric, cord, or wire reinforced rubber hose of appropriate bore diameter, or the like.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a conveyer for moving granular or pulverized materials as a continuous mass, a conduit closed against gravitational discharge except for spaced material loading and unloading openings through which the materials flow by gravity, and an endless, flexible, extensible and contractible conveyer element arranged to travel through and to cooperate with the walls of the conduit to move material delivered to the conduit through the loading opening to the unloading opening for discharge therethrough, said element being so constructed and operated as to extend and contract in proportion to variations in stress imposed thereon by the material being moved.

2. In a conveyer for moving granular or pulverized materials as a continuous mass, a conduit having spaced material loading and unloading openings, and an endless, flexible, tubular conveyer element arranged to travel through the conduit to move material delivered to the conduit through the loading opening to the unloading opening for discharge therethrough, said conveyer element being formed of sections or lengths arranged end to end, and means for interconnecting the adjacent ends of said sections or lengths and for obstructing the bore of the tubular element.

3. In a conveyer for moving granular or pulverized materials as a continuous mass, a conduit having spaced material loading and unloading openings, an endless, flexible, extensible and contractible conveyer element arranged to travel through the conduit to move material delivered to the conduit through the loading opening to the unloading opening for discharge therethrough, friction means for driving the conveyer element which will allow slippage to occur between the element and the means to compensate for variations in the length of the element resulting from retarded movement of the element through the conduit, and means for varying the traction between the element and the means.

4. In a conveyer for moving granular or pulverized materials as a continuous mass, a conduit having spaced material loading and unloading openings, and an endless, flexible, tubular conveyer element arranged to travel through the conduit to move material delivered to the conduit through the loading opening to the unloading opening for discharge therethrough, said conveyer element being formed of one or more helixes connected end to end.

5. In a conveyer for moving granular or pulverized materials as a continuous mass, a conduit having spaced material loading and unloading openings, and a conveyer element in the form of a helix arranged to travel through the conduit to move material from the loading opening to the unloading opening, said element having a predetermined minimum pitch having a space between adjacent turns when passing by the loading opening to allow a proper amount of material to pass into the bore of the helix for movement thereby and having a maximum pitch, resulting from load imposed stress, when it reaches the unloading opening to allow the material to freely flow by gravity from the bore of the helix.

6. In a conveyer for moving granular or pulverized materials as a continuous mass, the improvement which comprises a conveyer element of endless helical form having its turns spaced to admit and discharge materials, said element being formed of sections connected end to end.

7. In a conveyer for moving granular or pulverized materials as a continuous mass, the improvement which comprises an endless, flexible, tubular conveyer element adapted to transport materials within its bore and having openings in its wall through which the materials may pass in entering and leaving the bore, and means for obstructing the bore of the tubular element at one or more points.

8. In a conveyer for moving granular or pulverized materials as a continuous mass, the improvement which comprises an endless, flexible, extensible, and contractible tubular conveyer element adapted to transport materials within its bore and having openings through which the materials may pass in entering and leaving the bore, said element being formed of sections or lengths arranged end to end, and means for interconnecting the adjacent ends of said sections or lengths and for obstructing the bore of the tubular element.

9. In a conveyer for moving granular or pulverized materials as a continuous mass, a conduit closed against gravitational discharge except for spaced material loading and unloading openings through which the materials flow by gravity, and an endless conveyer element of helical form arranged to travel through and cooperate with the walls of the conduit to move material through the conduit from the loading opening to the unloading opening, said conveyer element being extensible and contractible with the convolutions spaced the normal distance for admitting the material when passing the loading opening and being spaced a greater distance, as a result of extension of the element by the conveyed load, for releasing the material when passing the unloading opening.

WILBUR G. HUDSON.